United States Patent
Yu et al.

(10) Patent No.: US 8,216,735 B2
(45) Date of Patent: Jul. 10, 2012

(54) THERMAL MANAGEMENT SYSTEM FOR HIGH-TEMPERATURE FUEL CELL

(75) Inventors: Dung-Di Yu, Taoyuan County (TW); Yung-Neng Cheng, Taoyuan County (TW); Ruey-Yi Lee, Taoyuan County (TW)

(73) Assignee: Institute of Nuclear Energy Research, Tiaan Village, Longtan, Taoyuan (TW)

( * ) Notice: Subject to any disclaimer, the term of this patent is extended or adjusted under 35 U.S.C. 154(b) by 357 days.

(21) Appl. No.: 12/628,218

(22) Filed: Dec. 1, 2009

(65) Prior Publication Data

US 2011/0129744 A1 Jun. 2, 2011

(51) Int. Cl.
*H01M 8/02* (2006.01)
*H01M 8/04* (2006.01)
*H01M 8/18* (2006.01)

(52) U.S. Cl. ........ 429/433; 429/415; 429/423; 429/434; 429/435; 429/436

(58) Field of Classification Search .................. 429/415, 429/423, 433–436
See application file for complete search history.

(56) References Cited

U.S. PATENT DOCUMENTS

| | | | |
|---|---|---|---|
| 2001/0028968 A1* | 10/2001 | Griesmeier | 429/19 |
| 2006/0127720 A1* | 6/2006 | Ferrall et al. | 429/22 |
| 2011/0129746 A1* | 6/2011 | Yu et al. | 429/424 |

FOREIGN PATENT DOCUMENTS

JP 05217594 A * 8/1993

* cited by examiner

*Primary Examiner* — Gregg Cantelmo

(57) ABSTRACT

A thermal management system for high-temperature fuel cell mainly comprises a first mixer to introduce external fuel to a reformer, a reformer to adjust the gaseous fuel to a proper composition ratio and output the fuel to the anode input of the fuel cell, a second mixer to introduce external ambient air to the cathode input of the fuel cell, a cathode thermal cycle pipeline to deliver the high-temperature air from the cathode output of the fuel cell to pass through the second mixer and the reformer and also heat the second mixer and the reformer to recover the heat, an anode thermal cycle pipeline to introduce the water steam from the anode output of fuel cell, remaining fuel and thermal energy to the first mixer to mix with incoming fuel, and provide sufficient water-to-carbon ratio and the inlet temperature required for the reformer.

10 Claims, 2 Drawing Sheets

THERMAL MANAGEMENT SYSTEM FOR HIGH-TEMPERATURE FUEL CELL

BACKGROUND OF THE INVENTION

1. Field of the Invention

The present invention is related to a thermal management system for high-temperature fuel cell. Especially, it refers to a thermal energy circulation mechanism for fuel cell to reduce installation cost, minimize fuel consumption and pollution, and improve overall operation efficiency.

2. Description of the Prior Art

In principle, fuel cell is operated on cathode and anode that are filled with electrolyte solutions. Between the two electrodes, there is a permeative membrane. Hydrogen enters the cell from anode while oxygen (or air) enters from cathode. With catalyst, hydrogen atom at anode is dissociated to two protons and two electrons. The protons are attracted by oxygen and move to the other side of the membrane. The electrons flow through the external circuit and arrive in cathode. With the catalyst at cathode, hydrogen protons, oxygen and electrons react to form water molecules. Thus, the only product of fuel cell (emission) is water. The above "hydrogen" fuel can come from any hydrocarbons, such as natural gas, methanol, ethanol (alcohol), water electrolysis, biogas . . . etc. Since fuel cell utilizes the chemical reaction between hydrogen and oxygen to produce electricity and water, there is absolutely no pollution and no issues with traditional battery in lengthy charging process. Moreover, fuel cell has become a generally recognized alternative to fossil fuels due to its low cost, wide fuel selection (including: pure hydrogen, methanol, ethanol and natural gas etc.), no hazards in reaction process and potential use of by-product (water).

Among various types of fuel cell structures, high-temperature fuel cell (such as solid oxide fuel cell SOFC and molten carbonate fuel cell etc.) must operate at high temperature. Thus, it is a feasible and common practice to recover the thermal energy from the tailpipe emission that contains high heat content and to heat incoming gas. Since heat is generated during the power generation process of fuel cell, excessive heat causes excessively high temperature or temperature increase rate for fuel cell. To prevent damage to fuel cell due to high temperature, it usually needs to introduce a large amount of air to maintain a stable temperature. However, the introduced air at cathode contains more oxygen than that is needed by fuel cell. It will reduce the loss of thermal energy and improve overall power generation efficiency by recycling most of the hot air at cathode and adding necessary fresh air.

The thermal energy cycle in a traditional high-temperature fuel cell is shown in FIG. 1. Mainly, a fuel blower 12 withdraws fuel from a fuel tank 11 and transfers the gasified fuel to the first mixer 10. A water pump 52 transfers the water from a water tank 51 to the third heat exchanger 50 that converts water into steam. Then the steam is delivered to the first mixer 10 and mixes with the fuel. The mixed fuel steam is sent to the first heat exchanger 6 for heating and then to a reformer 3. The reformer 3 will adjust the ratio of gas fuel to steam and outputs to the anode input 4Ai of fuel cell 4. An air blower 202 sends external air 21 to the second heat exchanger 20 for heating and then to the cathode input 4Ci of fuel cell 4. In the above structure, the cathode output 4Co of fuel cell 4 connects to the second mixer 8 through the first heat exchanger 6 to form a cathode thermal cycle pipeline C. So after the high-temperature air produced by fuel cell 4 is used to heat the first heat exchanger 6 and then introduced to the second mixer 8. The anode output 4Ao of fuel cell 4 can directly connect to the second mixer 8 to allow the steam and heat produced from fuel cell 4 to enter the second mixer 8 and mix with previously-mentioned high-temperature air. After heating by a combustor 7, the stream passes through the reformer 3, the second heat exchanger 20 and the third heat exchanger 50 for heat exchanging (heating). At last, low-temperature water steam and residual fuel are discharged to outside. The cycle allows the high-temperature air from cathode output 4Co to enter the second mixer 8 and the steam and high-temperature residual fuel from anode output 4Ao to enter the second mixer 8. This enables recovery of thermal energy produced by fuel cell 4.

However, the above structure has the following drawbacks in a practical application:

1. Since the assembly consists of three heat exchangers and one combustor, its overall installation cost is high and its size is huge.

2. It lacks recycle mechanism for anode fuel and fails to recycle the water steam and residual fuel. Therefore, both fuel consumption and power generation efficiency are poor. Besides, the recovery of cathode hot air is poor and thermal energy efficiency cannot be improved.

3. Because a combustor is used for heating, it increases fuel consumption and the combustion emission may cause environmental pollution.

In view of the above drawbacks associated with the thermal cycle for a traditional high-temperature fuel cell, the inventor has made improvements in the present invention.

SUMMARY OF THE INVENTION

The main objective for the present invention is to provide a thermal management system for high-temperature fuel cell thermal management. Since it does not need a combustor for heating, it effectively reduces duel consumption and improves overall power generation efficiency.

Another objective for the present invention is to provide a cell thermal management system for high-temperature fuel cell without heat exchanger to effectively lower installation cost and save space.

Another objective for the present invention is to provide a cell thermal management system for high-temperature fuel cell to effectively reduce combustion emission and minimize environmental pollution.

To achieve the above objectives, the approaches of the present invention include: the first mixer to introduce external fuel and heat, vaporize and output it; the second mixer to introduce external ambient air to the cathode input of a fuel cell; a reformer to introduce gas fuel from the first mixer and adjust the concentration ratio for the gas fuel and output it to the anode input of the fuel cell; a cathode thermal cycle pipeline that is formed by connecting the second mixer to the cathode input of the fuel cell and passing the cathode output of the fuel cell to the second mixer and the reformer, to mix the high-temperature air produced by the fuel cell and the external air and heat the reformer; an anode thermal cycle pipeline that is formed by connecting the first mixer through the reformer to the anode input of the fuel cell and connecting the anode output of the fuel cell to the first mixer, to charge the water steam and high-temperature residual fuel from the fuel cell to the first mixer and to supply sufficient water-to-carbon ratio (S/C ratio) and inlet temperature required by the reformer.

The above system may also contain the third mixer that is located between the first mixer and the reformer to introduce external water vapor to mix with the output fuel from the first mixer.

For the detailed structure, application principle, function and performance, please refer to the explanation for the attached figures.

DETAILED DESCRIPTION OF THE INVENTION

Figure 1:
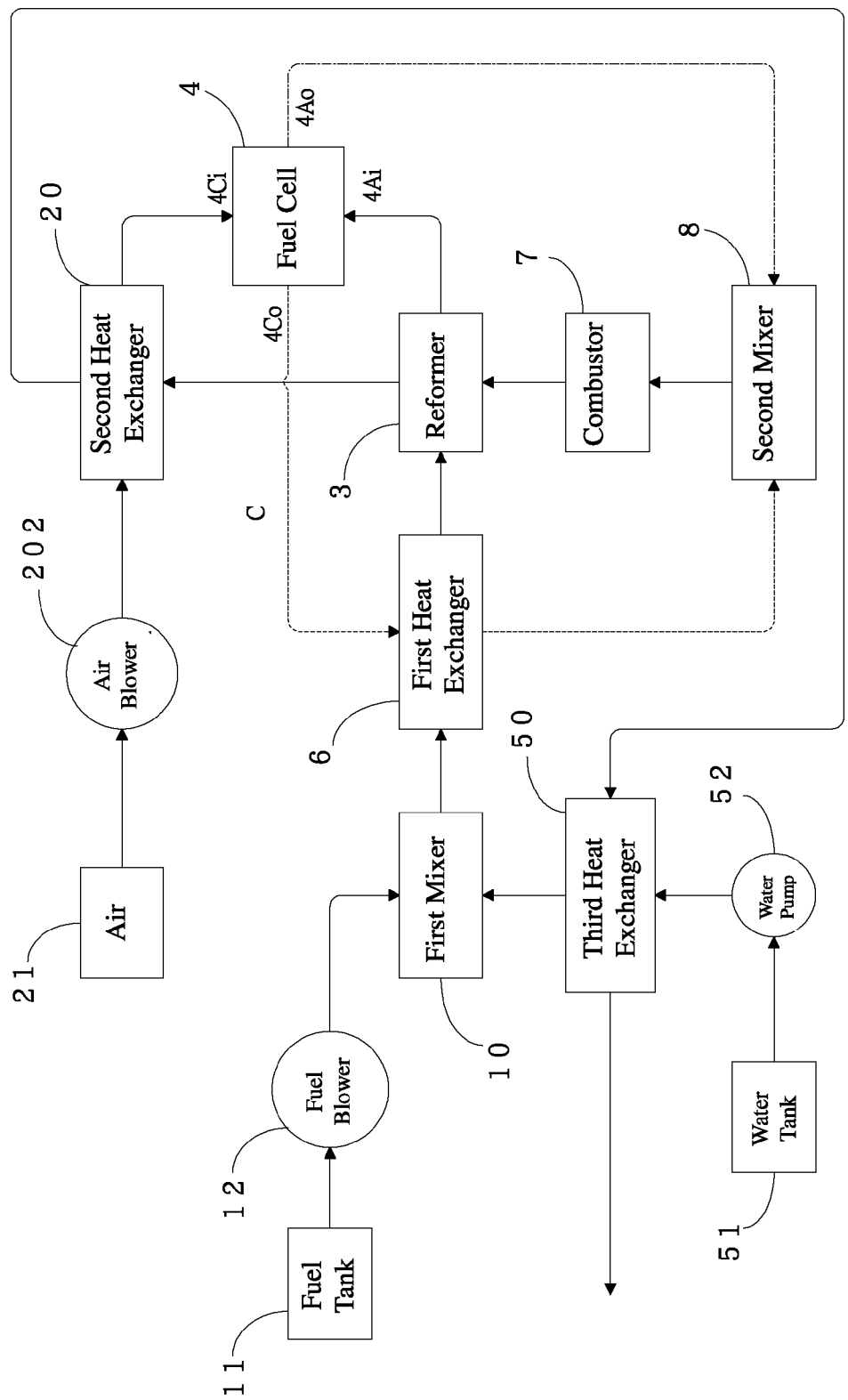
FIG. 1 is the block diagram of the thermal cycle for a traditional high-temperature fuel cell.
Figure 2:
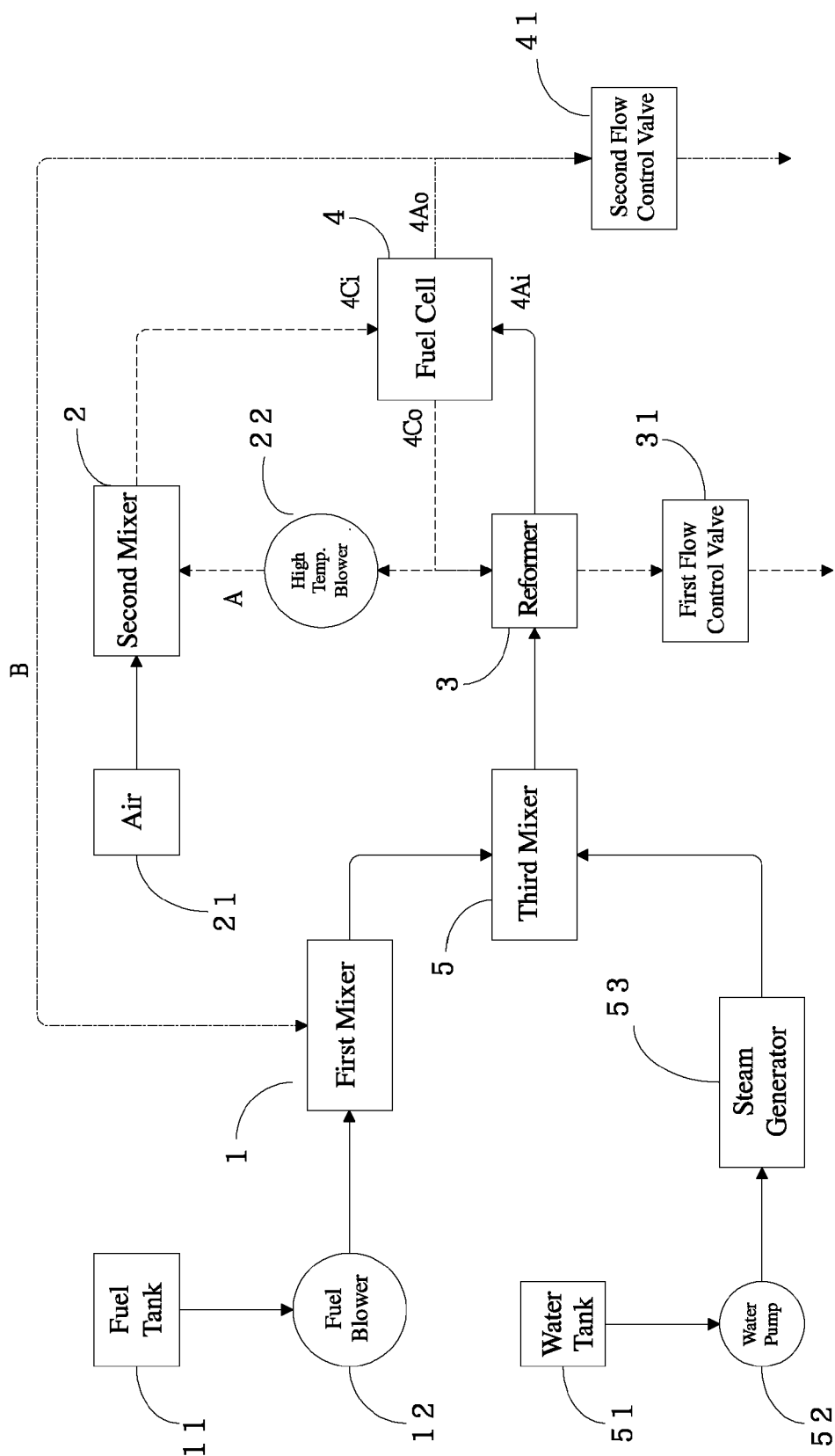
FIG. 2 is the block diagram for the overall structure of the present invention.

Please refer to FIG. 2. The system of the present invention mainly comprises: the first mixer 1, the second mixer 2, a reformer 3, a fuel cell 4, the third mixer 5 and cathode thermal cycle pipeline A, anode thermal cycle pipeline B. The fuel and water for the operation of fuel cell 4 are stored in a fuel tank 11 and a water tank 51 respectively. The fuel from the fuel tank 11 is pressurized by a fuel blower 12 and charged to the first mixer 1. The water from the water tank 51 is charged by a water pump 52 into a steam generator 53. The steam generator 53 converts water to steam. The (gaseous) fuel from the first mixer 1 and the steam from the steam generator 53 are mixed in the third mixer 5 and sent to the reformer 3. The reformer 3 regulates the ratio of the gaseous fuel and the steam and sends the mixture to the anode input 4Ai of fuel cell 4. The second mixer 2 receives external ambient air to the cathode input 4Ci of fuel cell 4. The cathode thermal cycle pipeline A is formed by connecting the second mixer 2 to the cathode input 4Ci of fuel cell 4 and through the cathode output 4Co of fuel cell 4 passing the reformer 3 and through a high-temperature blower 22 connecting to the second mixer 2. The cathode thermal cycle pipeline A may connect to outside through the first flow control valve 31 to form a cycle. The anode thermal cycle pipeline B is formed by connecting the first mixer 1 through the third mixer 5 to the reformer 3 and connecting the reformer 3 to the anode input 4Ai of fuel cell 4 and through the anode output 4Ao of fuel cell 4 connecting to the first mixer 1. The anode thermal cycle pipeline B may connect to outside through the second flow control valve 41 to form another cycle.

In operation, the external ambient air coming to the cathode input 4Ci of fuel cell 4 will become high-temperature air at the cathode output 4Co of fuel cell 4. Part of the high-temperature air is withdrawn by the high-temperature blower 22 in the cathode thermal cycle pipeline A (the speed of high-temperature blower 22 is determined by the operation temperature and the air flow rate Tin of the cathode input 4Ci of fuel cell 4) and charged to the second mixer 2 to mix with external ambient air to recover the thermal energy contained in the high-temperature air. This will increase incoming air temperature to the cathode input 4Ci of fuel cell 4 and in the meantime the high-temperature air will be discharged to outside by the first flow control valve 31 to prevent the operation of fuel cell 4 from high heat. After the reformer 3 adjusts the ratio of fuel coming to the anode input 4Ai of fuel cell 4, water steam and high-temperature remaining fuel will be generated at the anode output 4Ao of fuel cell 4. Part of the steam and high-temperature remaining fuel will be sent to the first mixer 1 through the anode thermal cycle pipeline B to mix with the gaseous fuel from the fuel blower 12, and therefore the fuel will have sufficient water-to-carbon ratio (S/C ratio>2) and the required inlet temperature for the reformer 3. Other steam and high-temperature remaining fuel can be discharged o outside by the second flow control valve 41 to prevent heat accumulation and interference with the operation of fuel cell 4.

In the above system structure for the present invention, the fuel flow rate at fuel blower 12 output is determined by the preset fuel utilization rate (Uf) and electric power requirement. The action of the first flow control valve 31 is determined by the maximum air utilization rate Ua (<70%) and the temperature difference between the cathode input 4Ci and the cathode output 4Co of fuel cell 4 (between 50~150° C.).

$$U_a = \frac{I \times N_c / F / 4}{Q_{c,l} \times R_f \times 0.21} \leq 70\%$$

I is output current; Nc is number of cells; F is faraday constant; Qc,1 is air flow rate in cathode loop; Rf is fresh air replacement rate.

In the above system structure for the present invention, because the water steam and high-temperature remaining fuel from the anode output 4Ao of fuel cell 4 are charged to the first mixer 1 and supply some of the needed water steam, in a practical application, the water tank 51, the water pump 52, the steam generator 53 or the third mixer 5 can be omitted to lower overall construction and installation cost.

From the above, the thermal management system for the high-temperature fuel cell for the present invention can indeed lower construction and installation cost, minimize fuel consumption and pollution, improve operation efficiency and therefore have commercial utility, novelty and progressiveness.

However, the above description is merely one preferred embodiment for the present invention and shall not limit the scope of the present invention. Those equivalent alterations and modification according to the patent application claims shall all fall into the scope of the present invention.

What is claimed is:

1. A thermal management system for a fuel cell, comprising:
   a first mixer mixing an external fuel with a combination of a recycled fuel and steam output from an anode output of the fuel cell and outputting a mixed fuel;
   a second mixer mixing an external ambient air and a recycled air output from a cathode output of the fuel cell and outputting a mixed air to a cathode input of the fuel cell;
   a reformer in a path for conveying fuel between the first mixer and the fuel cell, wherein the mixed fuel is conveyed to the reformer and the reformer adjusts a fuel concentration and outputs an adjusted fuel to an anode input of the fuel cell;
   a cathode thermal cycle pipeline connecting the second mixer to the cathode input of the fuel cell and connecting the cathode output of the fuel cell to the second mixer and to the reformer; and an anode thermal cycle pipeline connecting the first mixer to the anode input of the fuel cell through the reformer and connecting the anode output of the fuel cell to the first mixer.

2. The thermal management system of claim 1 further comprising a third mixer in the path for conveying fuel between the first mixer and the reformer, wherein the third mixer mixes the mixed fuel with an external water steam.

3. The thermal management system of claim 2 further comprising a steam generator at an upstream of the third mixer, wherein the external water steam is heated by and output from the steam generator.

4. The thermal management system of claim 1 further comprising a first flow control valve on the cathode thermal cycle pipeline.

5. The thermal management system of claim 4, wherein the first flow control valve operates based on a maximum air utilization rate and a temperature difference between the cathode output and the cathode input of the fuel cell.

6. The thermal management system of claim 5, wherein the maximum air utilization rate is smaller than 70% and the temperature difference between the cathode output and the cathode input of the fuel cell is between 50 and 150° C.

7. The thermal management system of claim 1 further comprising a blower in the cathode thermal cycle pipeline between the cathode output of the fuel cell and the second mixer.

8. The thermal management system of claim 7, the high-temperature blower has a speed determined by an operation temperature and air flow rate at the cathode input of the fuel cell.

9. The thermal management system of claim 1 further comprising a second flow control valve on the anode thermal cycle pipeline.

10. The thermal management system of claim 1 further comprising a fuel blower at an upstream of the firs mixer, wherein the external fuel is pressurized by the fuel blower.

* * * * *